Oct. 1, 1957  A. G. THOMAS  2,808,556
TWO PHASE STEP MOTOR
Original Filed Aug. 30, 1954  2 Sheets-Sheet 2
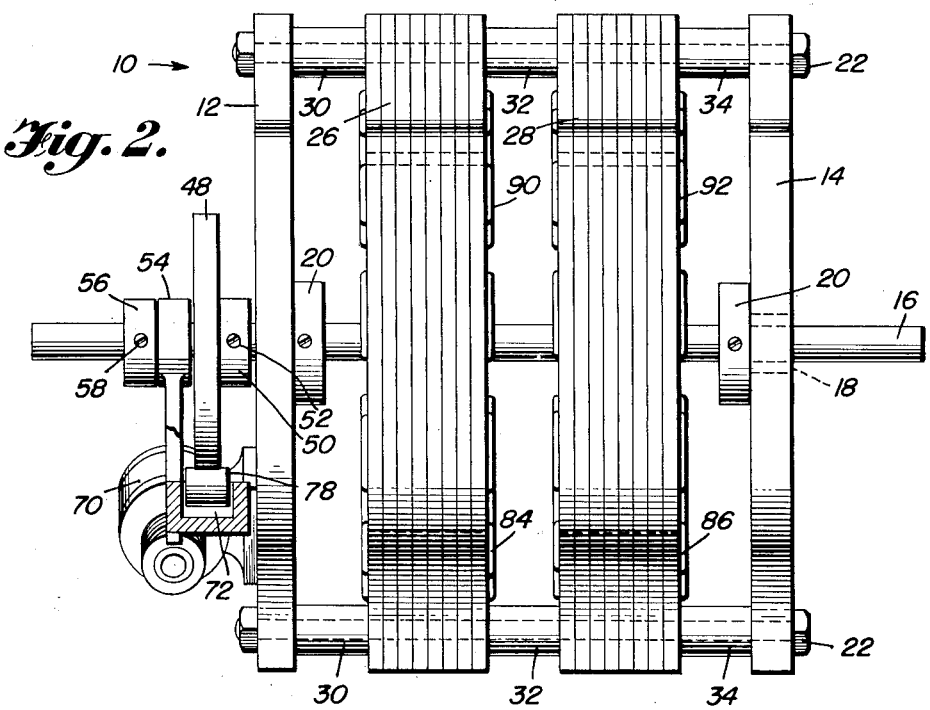
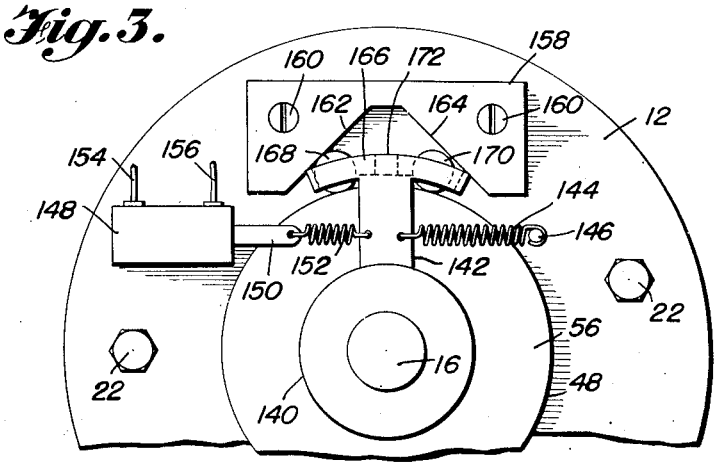
INVENTOR
Albert G. Thomas
BY Diggins & LeBlanc
ATTORNEYS United States Patent Office 2,808,556
Patented Oct. 1, 1957

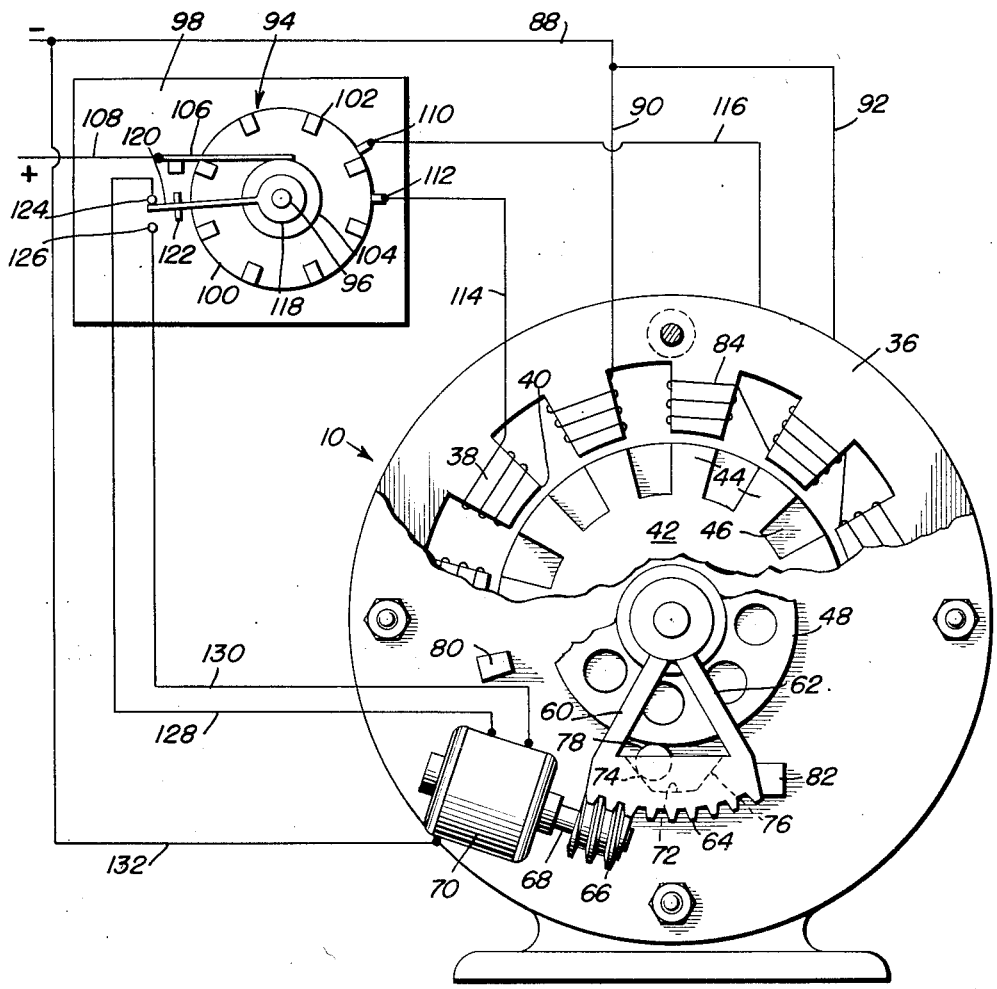

2,808,556
TWO PHASE STEP MOTOR
Albert G. Thomas, Butler, Pa.

Original application August 30, 1954, Serial No. 452,949. Divided and this application April 1, 1957, Serial No. 649,745

20 Claims. (Cl. 318—254)

This invention relates to electromagnetic devices and more particularly to step motors or the like. This application is a division of my copending application Serial No. 452,949, filed August 30, 1954, which in turn is a continuation-in-part of my copending applications, Serial Nos. 295,694, filed January 20, 1952; 373,187 filed August 10, 1953; and 406,740, filed January 28, 1954.

In building and operating step motors of the type disclosed in the foregoing applications, I have found that it is desirable to reduce rotor inertia and to provide increased magnetic pull or electrodynamic reaction where a wound rotor is used. While numerous applications of these motors do not require extremely rapid response, a large number of applications do require that the rotor be accelerated quite rapidly.

It is accordingly a primary object of the present invention to provide a step motor having a rotor with lower inertia than motors having three rotor units.

It is another object of the invention to provide a step motor of the foregoing type having two rather than three phases.

It is another object of the invention to provide a step motor having a pair of sets of rotor poles and a pair of phased sets of stator poles mounted to cooperate with such rotor poles.

These and further objects and advantages of the invention will become more apparent upon reference to the following specification and claims and appended drawings wherein:

Figure 1 is a partly broken away vertical elevation of a step motor constructed according to one embodiment of my invention.

Figure 2 is a plan view of the motor of Figure 1; and

Figure 3 is a vertical end elevation of another embodiment of braking and starting device constructed according to my invention.

Referring more particularly to Figures 1 and 2 of the drawings, there is seen a step motor 10 comprising a pair of end plates 12 and 14 in which a shaft 16 is journaled. The shaft 16 is received in bearings 18, shown only diagrammatically, which may be ball or roller bearings and which should, preferably be of the semi-thrust type. Axial shift of the shaft is prevented by means of a pair of collars 20 mounted within and in engagement with the end plates 12 and 14.

The end plates 12 and 14 are secured together by means of elongated bolts 22 which also suport a pair of laminated stators 26 and 28 between suitable spacers 30, 32 and 34. These spacers are formed of a non-magnetic material such as aluminum or brass and the stators are formed of a metal having a good magnetic permeability such as silicon steel. The motor may be assembled in an outside frame or dowels may be employed to prevent twist of the assembly.

Each stator 26 and 28 consists of a ring portion 36, best seen in Figure 1, having poles or teeth 38 extending radially inward therefrom. The circumferential length of the faces 40 of these stator poles is preferably equal to the circumferential spacing between adjacent poles.

A pair of rotors 42 is mounted on the shaft 16 in register with the two stators 26 and 28.

The forwardmost rotor, as seen in Figure 1, carries a set of poles or teeth 44 which are in circumferential register with the poles or teeth 38 of the first stator, with which this first rotor is axially aligned. The number of teeth or poles in the rotor is equal to the number of teeth or poles in the stator, and the circumferential width of the rotor poles is preferably equal to the circumferential width of the associated stator poles and to the circumferential spacing between such stator poles.

The second rotor, or the rearmost rotor in Figure 1, is provided with a similar set of poles or teeth 46 which have a similar dimensional relationship to the associated stator poles. The two rotors are positionally phased so that when the teeth or poles 44 of the first rotor are in register or alignment with the teeth of poles 38 of the forwardmost stator unit in Figure 1, the teeth 46 of the other rotor are bridging the inner circumferential spaces between the stator teeth of the second stator 28. It will be noted from the drawing that the rotor teeth fully or completely bridge the spaces between the stator teeth and this is important in order to obtain maximum power and reliability of operation. While the two stators shown in the illustrations of the drawing are aligned, it will be understood that the two stators could be positionally phased providing that corresponding allowance is made for such phasing in the placement of the rotor teeth.

It will be noted from the foregoing that when poles of one rotor are in register with poles of its associated stator, the poles of the other rotor substantially fully bridge the spaces between the pole tips of the other stator. While the motor is operable when the poles of the rotor do not fully bridge the gaps between the pole tips of the stators this construction has been found to provide maximum power and reliability of operation in a two-phase step motor.

Mounted on shaft 16 is a disc 48 which is secured to the shaft by means of a hub 50 and set screw 52. The disc 48 is preferably of low inertia and may have holes or spokes therein to reduce the inertia. A collar 54 is rotatably mounted on shaft 16 outwardly of disc 48 and is maintained in axial position on the shaft by means of a fixed collar 56 which may be fastened to the shaft by means of a set screw 58.

The floating collar 54 has a pair of generally radial depending arms 60 and 62 which carry a toothed sector 64 at the bottom thereof. The teeth 63 of this sector engage a worm gear 66 which is mounted on the shaft 68 of a reversible motor 70. The top of the sector 64 is hollowed out or recessed at 72 to form a V-shaped cam having oppositely inclined hardened surfaces 74 and 76. A hardened roller 78 is received in the recess 72 in the sector 64 and is engaged between the inclined hardened surfaces 74 and 76 and the peripheral surface of the disc 48, which is also formed of a hardened material or at least of a material having a hardened peripheral surface.

It will be seen from an inspection of Figure 1 that when the motor 70 drives the toothed sector 64 into the position shown, wherein the roller 78 is cammed between the inclined surface 74 and the peripheral surface of disc 48, the disc 48 and consequently the shaft 16 can rotate only in a counterclockwise direction. On the other hand, when the motor 70 drives the toothed sector 64 to the left in Figure 1, so that the roller 78 is cammed between inclined surface 76 and disc 48, the disc and the shaft 16 can rotate only in a clockwise direction.

A first stop 80 is mounted on the end plate 12 in a position to limit the clockwise movement of the toothed sector 64. A second stop 82 is also mounted on the surface of end plate 12 to limit the counterclockwise movement of the toothed sector 64 by engagement with the side thereof, as shown in Figure 1. The positional placement of these stops is important as will appear hereinafter.

Magnetizing coils 84 are wound around each pole or tooth 38 of the forwardmost stator unit 26 in Figure 1, and these may be connected in series making the polarity of every alternate tooth the same. Parallel and series parallel connections are also possible to decrease inductance. Both stators are preferably provided with an even number of poles and every other tooth can be fully wound if desired. Similar stator windings 86 are provided on the poles or teeth of the rearmost stator 28, as seen in Figure 2, and these are similarly preferably connected in series so as to make the alternate stator teeth of stator unit 28 of a like polarity. The stator teeth of the stator unit 28 are equal in number and spacing to the teeth of stator unit 26 and, in the embodiment of the invention of the unit shown in the drawings, are aligned therewith. One terminal of the stator winding 84 is connected to a negative supply line 88 by means of a conductor 90, and one terminal of the stator winding 86 is connected to the negative supply line 88 by a conductor 92.

In order to provide driving current for the motor 10, there is provided by way of illustration a driving commutator or control device indicated generally at 94. This device consists of a shaft 96 rotationally mounted on an insulating plate 98 and carrying a disc 100. The disc 100 is made of an insulating material and is keyed or otherwise secured to the shaft 96 so that it may be driven by means of a crank, not shown, or other driving means, such as a motor or control device. A series of commutator bars 102 are mounted in the surface of the disc 100 and are connected to a collector ring 104. A brush 106 is mounted on the plate 98 and wipes against the collector ring 104. The brush 106 is connected by conductor 108 to the positive terminal of the direct current source of supply. The negative terminal of this source of supply is, of course, connected to the negative supply line 88. A pair of brushes 110 and 112 are urged against the surface of the disc 100 in a conventional manner for periodic contact with the commutator bars 102 upon rotation of the disc.

As has been explained, one terminal of stator winding 84 is connected to the negative terminal of the source of supply by conductor 90, while one terminal of stator winding 86 is connected to the negative terminal of the source of supply by a conductor 92. The other terminal of winding 84 is connected to brush 112 by means of conductor 114, while the other terminal of winding 86 is connected to brush 110 by means of conductor 116. The windings 84 and 86 of the motor 10 are such that the motor can pass full current while stalled without burning out the windings.

The commutator bars 102 are equally spaced about the periphery of disc 100 and are separated so that one stator is energized as the other is de-energized. Alternatively, the bars may be so spaced that de-energization occurs after energization of the other stator has been accomplished.

A friction ring 118 is mounted on the shaft 96 and carries a contact arm 120. A suitable spring may be attached to the ring in order to provide friction by rubbing against the shaft 96 in a known manner. A peaked cam 122 is mounted on the plate 98 beneath the contact arm 120 and engages the arm to cause it to snap against either of a pair of contacts 124 and 126 which are mounted on the plate. The contacts 124 and 126 serve as stops to limit the movement of the contact arm 120. Contact 124 is connected to one terminal of the reversible direct current motor 70 by means of a conductor 128. Contact 126 is connected to another terminal of the reversible direct current motor 70 by means of a conductor 130, and the remaining terminal of the direct current motor is connected to the negative lead 88 by means of conductor 132. The contact arm 120 is connected to the collector ring 104 so as to provide a connection between the positive supply line 108 and the contact arm.

The torque tending to turn the rotor is maximum with a small rotor overlap with respect to the associated stator teeth. I have found that with a 10% rotor overlap considerably more torque is provided than, for instance, with a 30 or 50% overlap. The actual circular width of the stator and rotor poles or teeth may be designed to meet varying conditions of load and other factors.

The operation of this device is as follows: When the control or commutator shaft 96 is rotated in a clockwise direction, current is alternatively supplied to the stator windings 84 and 86 first through brush 110 then through brush 112. The friction between the ring 118 and shaft 96 or disc 100 causes the contact arm 120 to engage contact 124 to close the circuit to motor 70 through lead 128. This causes the motor to rotate the worm 66 in the direction to move the toothed sector 64 against stop 82, where it is held. When this movement occurs, the inclined cam surface 74 strikes the roller 78 and forces it against the disc 48 to prevent clockwise rotation thereof. The stop 82 is so placed that as the toothed sector 64 moves to the right in Figure 1, the roller cams between the inclined surface 74 and the disc 48 to rotate the disc through a small counterclockwise angle before the stop 82 is engaged. This arrangement insures that the motor will always start upon reversal. That is to say, even if the rotor teeth 44 and 46 are at rest in the aligned or neutral position, shown in Figure 1, these teeth are moved to overlap the stator teeth by the action of the cam so that, upon reversal, the motor will again start rotating. When the motor is rotated in a single direction and then stopped and again started, renewed rotation is assured by reason of the fact that the cam arrangement prevents backswing and thereby stops the rotor teeth in a slightly overlapped position with respect to the stator teeth.

When one group of stator poles is energized or magnetized, the associated rotor induced poles are magnetically snapped into alignment, but due to the momentum of the rotor system, the rotor poles swing past the aligned position so that the other rotor teeth overlap their associated stator teeth. Reverse rotation of the rotor is prevented by the brake or lock. As a result, when the other stator poles are energized, the overlapped associated rotor poles are snapped into alignment and beyond, so that the first named rotor poles will again overlap their associated stator poles and step rotation of the motor is possible even with two phases.

When rotation of the shaft 96 and the commutator controller is reversed, the contact arm 120 is snapped against contact 126 thereby connecting the other terminal of the motor 70 to the positive source of supply through lead 130. This causes the worm 66 to move the toothed sector 64 in a clockwise direction so that roller 78 is cammed between inclined cam surface 76 and the surface of the disc 48. As the toothed sector moves in this counterclockwise direction it rotates the disc 48 prior to engaging the stop 80 to insure some overlap of the rotor teeth. The rotor is then permitted to rotate in a clockwise direction but not in a counterclockwise direction. Inasmuch as the brushes 110 and 112 are now being energized in a reverse sequence, the direction of rotation of the rotor is also reversed.

While the illustrated embodiment of the invention shows a clockwise rotation of the shaft 96 causing counterclockwise rotation of the rotor 42, it will be understood by those skilled in the art that clockwise rotation of the commutator can be made to cause clockwise rotation of the rotor assembly and shaft 96 by reversing the electrical connections.

Spacing and relative positioning of the contacts and other components can be such that the motor 70 moves the toothed sector 64 and disc 48 while the stator fields are de-energized. As a matter of fact, according to one embodiment of the invention, it is not necessary to move the disc 48 upon reversal due to the speed with which the effective direction of the brake is reversed. That is to say, if the effective direction of the brake is reversed before back swing of the rotor occurs, the rotor back swings past the aligned position in the desired direction.

Where rapid brake reversal is desired, it is advantageous to use a braking arrangement of the type shown in Figure 3. This view is an end elevation similar to that in Figure 1 and the same reference numerals are used where applicable. The motor is the same as that shown in Figure 1 except that the braking arrangement is modified.

According to this embodiment of the invention, a ring 140 is rotatably mounted upon the shaft 16. The ring 140 carries an arm 142 which is urged in a clockwise direction by means of a tension spring 144 connected to the arm and to a post 146 mounted on end plate 12. A solenoid 148 is also mounted on the face of end plate 12 and has a plunger 150 connected to the arm 142 through a tension spring 152. One terminal 154 of the solenoid 148 is connected to the negative terminal 88 of the source of supply, as seen in Figure 1, while the other terminal 156 is connected to the contact 124 on plate 98. Thus, when the shaft 96 of the controller is rotated in a clockwise direction, the solenoid 148 is energized to move the arm 142 in a counterclockwise direction for a purpose presently to become apparent.

An inverted V-shaped cam 158 is mounted on the end plate 12, as by means of screws 160, and is provided with oppositely inclined hardened cam surfaces 162 and 164. The arm 142 carries a yoke 166 in which a pair of hardened rollers 168 and 170 are caged. A partition 172 is provided in the yoke between the two rollers to keep them separated and positioned. It will be apparent that the yoke 166, rollers 168 and 170 and V-shaped cam 164 can be so dimensioned that extremely little rotation of the arm 142 is necessary in order to lock either roller 168 or roller 170 against the associated inclined cam surface. When solenoid 148 is energized, plunger 150 is pulled into the solenoid carrying the roller 168 over against its associated inclined surface 162. Under such circumstances, the rotor and shaft are permitted to rotate in a clockwise direction but cannot rotate counterclockwise. When the solenoid 148 is de-energized, the tension spring 144 pulls the arm 142 in a clockwise direction to carry roller 170 against its associated inclined surface 164 to permit counterclockwise rotation but to prevent clockwise rotation.

The operation of this embodiment is similar to that of the embodiment of the invention shown in Figures 1 and 2. That is, as the commutator 100 is rotated in a clockwise direction the stator windings are alternately energized. The contact arm 120 engages contact 124 to energize the solenoid 148 and move the roller 168 into engagement with the inclined surface 162. This permits rotation in a clockwise direction but prevents rotation in a counterclockwise direction and thereby prevents backswing or hunting. Because backswing is prevented and because of the momentum of the rotor, a certain amount of overshooting always occurs so that the rotor always stops in a slightly overlapped position. When the motor of this embodiment of the invention is reversed, the effective direction of the brake is quickly reversed before backswing of the rotor occurs when released, so that the rotor back swings past the aligned position in the direction desired.

The two-phase motor of this invention possesses the advantage of lower rotor inertia, greater starting torque, and simpler construction, as compared with three-phase motors. The rotors may be cast out of steel or laminated, as desired. It will be obvious to those skilled in the art that other modifications of the broad principles which have been disclosed can be made. As an example, the rotors may be wound instead of the stators, and the stator poles may be phased, or the rotor poles may be phased. If the rotor or rotors are wound, the iron utilized can be reduced or removed from the rotor poles entirely, if desired, since the reaction of the current carrying conductors in the rotor with stator fields may be employed to provide torque. On the other hand, the rotor poles may be wound and both the magnetic pole and the reaction of the current carrying rotor conductors with the stator fields may be employed. The rotor poles may have individual surrounding windings or group windings. The motors described may be controlled by punched, magnetized, conductive, capacitive, light modulating or other radiation modulating tapes, belts, cards, discs, or other records of various kinds.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by the United States Letters Patent is:

1. In a two-phase step motor, a first stator having a plurality of poles, a first rotor having a plurality of poles associated therewith, a second stator having a plurality of poles, a second rotor having a plurality of poles associated with said second stator, means mounting said rotors for simultaneous rotation, the poles of said stators and rotors being relatively positionally phased so that poles of one rotor are substantially in register with spaces between poles of the other rotor, winding means for causing energization of the poles of the first stator and first rotor, other winding means for causing energization of the poles of the second stator and second rotor, and means for energizing said winding means alternately, and including means for limiting movement of said rotors in one direction, and means for causing reversal of the effective direction of said rotor movement limiting means and for moving said rotors through an angle substantially during the period of said reversal.

2. In a two-phase step motor, stator means having a first group of substantially equally spaced poles and a second group of substantially equally spaced poles, rotor means having substantially equally spaced poles associated with poles of said stator means and surrounded thereby, and relatively positionally phased with respect to said first and second groups of stator poles so that when poles of said first and second stator pole groups are energized alternately said rotor means is rotated through an angle subtended by one rotor pole for each step, means for causing alternate magnetization of said first and second groups of stator poles, a portion of said rotor poles being in register with pole tips of said first group of stator poles and another portion of said rotor poles being simultaneously in register with substantially the full circumferential spacings between pole tips of said second group of stator poles, and means continuously effective while said rotor means is being rotated in one direction for locking said rotor means against an appreciable rotation in the opposite direction, whereby said rotor stops at its approximate limit of overshoot in a self-starting position.

3. In a two-phase step motor, a rotor and a stator one of which has a plurality of magnetizable teeth and the other of which has two groups of magnetizable poles, said groups of poles being relatively positionally phased with respect to said teeth so that poles of one said group are in register with the tips of portions of said teeth on one side of a plane perpendicular to the axis of said motor when poles of the other said group substantially bridge the full circumferential spacing between tips of another portion of said teeth on the opposite side of said plane, means for causing alternate magnetization of said poles, and means continuously effective during rotation of said rotor in one direction for preventing appreciable rotation of said rotor in the opposite direction, whereby said rotor stops at its approximate limit of overshoot in a self-starting position.

4. In a two-phase step motor, stator means having a first group of substantially equally spaced poles and a second group of substantially equally spaced poles, rotor means having substantially equally spaced poles associated with poles of said stator means and surrounded thereby, and relatively positionally phased with respect to said first and second groups of stator poles so that when poles of said first and second stator pole groups are energized alternately said rotor means will be rotated through an angle subtended by one rotor pole for each step, means for causing alternate magnetization of said first and second groups of stator poles, a portion of said rotor poles being in register with pole tips of said first groups of stator poles and another portion of said rotor poles being simultaneously in register with substantially the full circumferential spacings between pole tips of said second group of stator poles, and means for limiting movement of said rotor means in predetermined direction, and means for causing reversal of the effective direction of said rotor movement limiting means and for moving said rotor means through an angle substantially during the period of said reversal.

5. In a two phase step motor, a first stator having a plurality of poles, a first rotor having a plurality of poles associated with poles of said first stator, a second stator having a plurality of poles, a second rotor having a plurality of poles associated with poles of said second stator, means mounting said rotors for simultaneous rotation, the poles of said stators and rotors being relatively positionally phased so that when poles of one rotor are in register with poles of the associated stator, poles of the other rotor will substantially fully bridge spaces between pole tips of the other stator, winding means for causing energization of the poles of the first stator and first rotor, other winding means for causing energization of the poles of the second stator and second rotor, and means for supplying current to said winding means alternately.

6. In a two phase step motor, a first stator having a plurality of substantially equally spaced poles with inner pole tip widths in generally circumferential direction substantially equal to the spacing between said pole tips, a first rotor surrounded by said first stator and having a plurality of equally spaced poles with pole tip widths in generally circumferential direction approximately equal to said pole tip widths of said first stator and adapted to be moved into register with the pole tips thereof, a second stator having a plurality of substantially equally spaced poles with inner pole tip widths in generally circumferential direction substantially equal to the spacing between said second stator pole tips, a second rotor surrounded by said second stator and having a plurality of equally spaced poles with pole tip widths in generally circumferential direction approximately equal to said pole tip widths of the second stator and adapted to be moved into register with the pole tips thereof, means mounting said rotors for simultaneous rotation, the poles of said stators and rotors being relatively positionally phased so that when poles of one rotor are in register with poles of its associated stator, poles of the other rotor will substantially fully bridge the spaces between pole tips of the other stator, and means for energizing the first stator and associated rotor poles and second stator and associated rotor poles, alternately.

7. In a two-phase step motor, a first stator having a plurality of poles, a first rotor having a plurality of poles associated therewith, a second stator having a plurality of poles, a second rotor having a plurality of poles associated with the said second stator, means mounting said rotors for simultaneous rotation, the poles of said stators and rotors being relatively positionally phased so that poles of one rotor are substantially in register with spaces between poles of the other rotor, winding means for causing energization of the poles of the first stator and first rotor, other winding means for causing energization of the poles of the second stator and second rotor, means for energizing said winding means alternately, and locking means limiting the rotation of said rotors in one direction to partial pole movements while allowing substantially free rotation thereof in the opposite direction.

8. A step motor as set out in in claim 7 including means for quickly reversing the effective direction of said locking means before the first maximum step rotation of said rotors occurs upon reversal of direction of rotation thereof.

9. A step motor as set out in claim 7 wherein said locking means includes means for holding said rotors substantially in their most advanced positions for each step movement thereof in one direction of rotation, additional means for holding said rotors substantially in their most advanced positions for each step movement thereof in a second direction the reverse of said one direction, and means for reversing the effective direction of said holding means before a full step movement of said rotors in a second direction occurs.

10. In a two phase step motor, a first stator having a plurality of poles, a first rotor having a plurality of poles associated therewith, a second stator having a plurality of poles, a second rotor having a plurality of poles associated with the poles of said second stator, the first stator and rotor poles being relatively positionally phased with respect to the second stator and rotor poles so that when the poles of said first rotor are in register with the poles of said first stator the poles of said second rotor will be out of register with the poles of said second stator, means for causing alternate magnetization of poles of said first stator and rotor and of poles of said second stator and rotor to cause step rotation of said rotors, and means for holding said rotors in substantially the most advanced step positions thereof for one direction of rotation.

11. A step motor as described in claim 10, said holding means being adapted also to hold said rotors in their most advanced step positions for rotation thereof in direction the opposite of said one direction, and means for causing said holding means to be momentarily ineffective and then to become effective in holding said rotors in their most advanced step positions in said opposite direction.

12. The device as described in claim 10, said holding means being adapted also to hold said rotors in their most advanced step positions for rotation thereof in direction the opposite of said one direction, and reversing means for causing said holding means to be momentarily ineffective and then to become effective in holding said rotors substantially in their most advanced step positions in said opposite direction, said reversing means being actuated during the time interval of magnetization of poles of the phase which is effective at the beginning of said reversing means actuation.

13. The method of operating a two phase step motor, said method comprising, alternately energizing said phases to cause rotation of said motor in steps in one direction, holding said motor in its most advanced position for each step rotation thereof in said direction, releasing said motor for one step rotation thereof in direction opposite to said one direction, and then holding said motor in its most advanced position for said one step rotation and for subsequent steps of rotation in said opposite direction.

14. The method of operating a two phase step motor having a first phase and first rotor associated therewith and a second phase and second rotor associated therewith, said method comprising, alternately energizing said phases to cause step rotation of said rotors in one direction, holding said rotors in substantially the most advanced step position thereof in said direction while one of said phases is energized, releasing said rotors for rotation through an angle in a direction the reverse of said one direction during the energization of said one phase, and reversing the effective direction of holding said rotors before energization of the other phase.

15. A step motor comprising rotor means and stator means and windings associated with at least one of said means for rotating said rotor in discrete steps in either direction, double acting brake means associated with said rotor for preventing rotation of said rotor in a direction opposite to that dictated by the energization of said windings, said brake means comprising a pair of stationary inclined cam surfaces, a member mounted for rotation with said rotor means and having a circular peripheral surface, a pair of rotatable cam members disposed between said inclined cam surfaces and said peripheral surface, movable cage means positioning said cam members, said cage means being movable to cause one or the other of said cam members to engage an inclined cam surface and said peripheral surface to permit rotation of said rotor means in one direction but not in the opposite direction, and means for moving said cage member so that said rotor means may rotate in the direction dictated by the energization of said windings.

16. A step motor as set out in claim 15 wherein said cage means is carried by a member rotationally mounted on said shaft which also carries said rotor means.

17. A step motor as set out in claim 15 including a solenoid for moving said cage means when the energization of said windings is reversed.

18. A step motor as set out in claim 15 wherein said cam members are rollers, held in spaced relation in a cage means rotatably mounted on a shaft carrying said rotor means.

19. The method of operating a two phase step motor having a first phase and first motor associated therewith and a second phase and a second rotor associated therewith, said method comprising, alternately energizing said phases to cause rotation of said rotors in one direction, holding said rotors in substantially the most advanced step position thereof in said direction while one of said phases is energized, releasing said rotors for rotation through an angle in a direction the reverse of said one direction during the energization of said one phase, and reversing the effective direction of holding said rotors before completion of said rotor of said rotors through said angle.

20. The method of operating a two phase step motor having a first phase and first rotor associated therewith and a second phase and a second rotor associated therewith, said method comprising, alternately energizing said phases to cause rotation of said rotors in one direction, holding said rotors in substantially the most advanced step position thereof in said direction while one of said phases is energized, releasing said rotors for rotation through an angle in a direction the reverse of said one direction during the energization of said one phase, and reversing the effective direction of holding said rotors before de-energization of the other phase after energization thereof.

References Cited in the file of this patent

UNITED STATES PATENTS

| | | |
|---|---|---|
| 1,301,050 | Hagman | Apr. 15, 1919 |
| 1,367,486 | Lebaron et al. | Feb. 1, 1921 |
| 1,440,729 | French | Jan. 2, 1923 |
| 1,977,745 | Thompson | Oct. 22, 1934 |
| 2,124,672 | Pershing | July 26, 1938 |
| 2,213,108 | Pollard | Aug. 27, 1940 |
| 2,449,020 | Spraragen | Sept. 7, 1948 |
| 2,507,798 | Maxwell | May 16, 1950 |
| 2,515,944 | Bennett | July 18, 1950 |
| 2,528,181 | Sacchini | Oct. 31, 1950 |
| 2,567,422 | Camp | Sept. 11, 1951 |
| 2,578,648 | Thomas | Dec. 11, 1951 |